April 24, 1951

H. W. SHOAF 2,550,387

FLOW PROPORTIONING DEVICE

Filed April 5, 1949

Inventor
Harry W. Shoaf

By Dodge & Ostn

Attorneys

April 24, 1951  H. W. SHOAF  2,550,387
FLOW PROPORTIONING DEVICE
Filed April 5, 1949  2 Sheets-Sheet 2
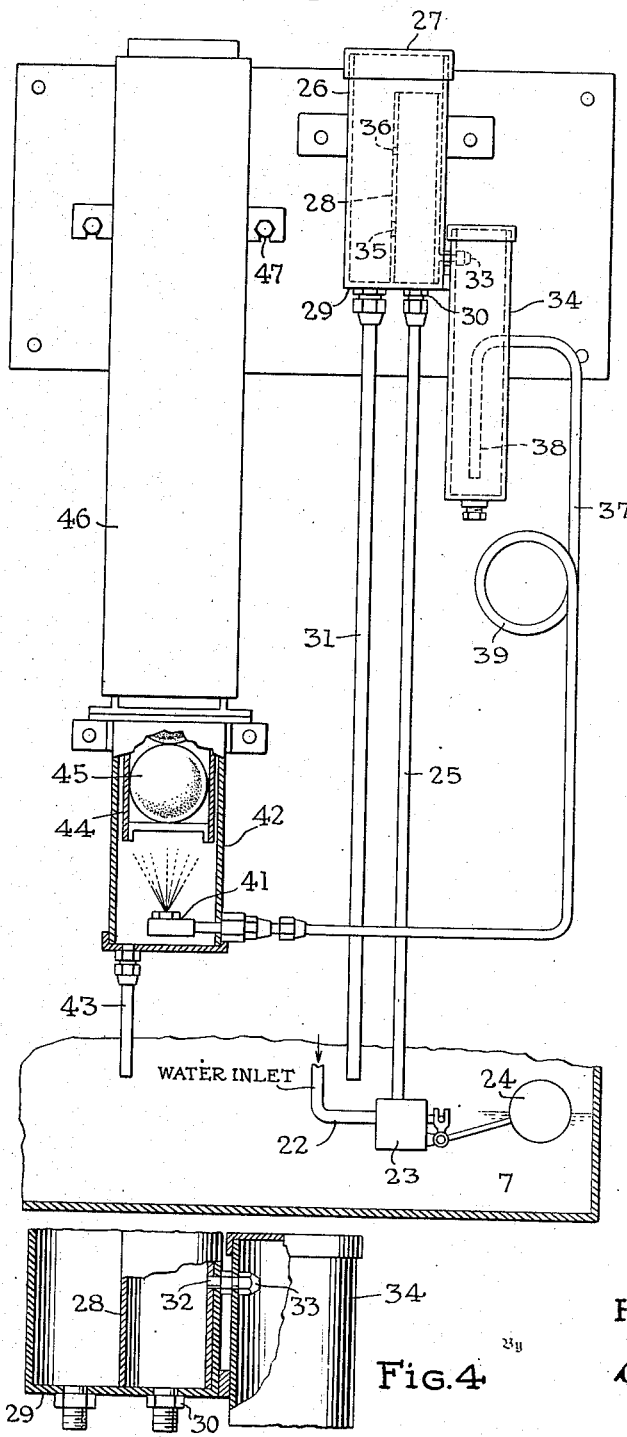
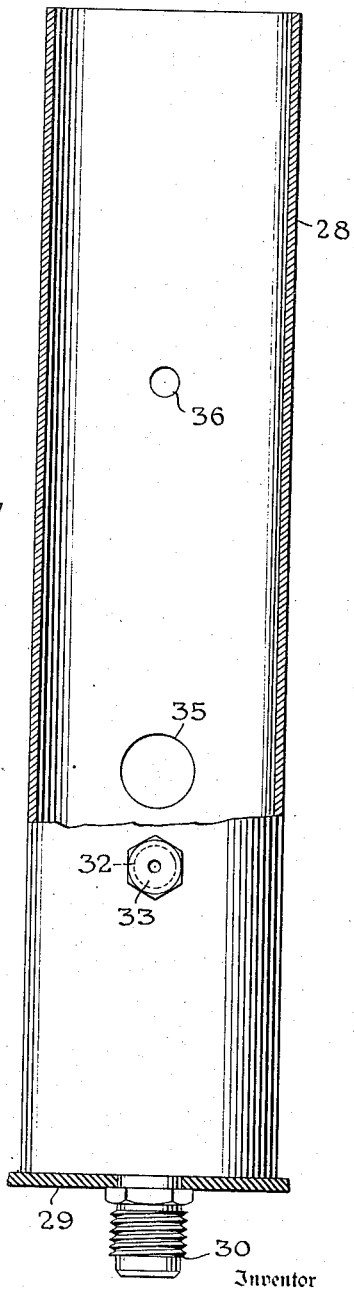
Inventor
Harry W. Shoaf
By Dodge
Attorneys Patented Apr. 24, 1951

2,550,387

UNITED STATES PATENT OFFICE 2,550,387

FLOW PROPORTIONING DEVICE

Harry W. Shoaf, York, Pa., assignor to York Corporation, York, Pa., a corporation of Delaware Application April 5, 1949, Serial No. 85,621

6 Claims. (Cl. 210—18)

This invention relates to means for feeding chemicals to a water bath at rates controlled by the rate of supply of make-up water.

The device was developed to control the chemical treatment of water used in the condensers of refrigerating plants, and will be described as so applied. This is selected simply as a typical commercial use; for the invention is applicable to other devices in which water is stored and requires chemical treatment proportioned to the supply of make-up water.

Limitations commonly imposed on the use of city water make it desirable to use condenser cooling water over and over, replacing that evaporated, and discharging to waste the minimum practicable amount. At temperatures characteristic of these condensers the growth of algae is troublesome. There are also problems of scaling and corrosion. The best corrective measure is chemical treatment.

The supply of make-up water is commonly controlled by a float valve in the sump or water supply tank. The invention provides a simple proportioning control having no moving parts and no very small measuring orifices. This control, regardless of the rate of supply, delivers an approximately uniform fraction of the make-up water to a dosing device which can take any known form. For simplicity this application illustrates the simplest form known to applicant, i. e., one in which the make-up water fraction is flowed in contact with a solid but water-soluble mass of the dosing chemical. When solutions must be fed the make-up fraction can be used to actuate any known chemical feeder.

A circulating pump draws water from the sump of the condenser and discharges it into contact with the heat exchange surface of the condenser. An adjustable bleeder is provided to discharge to waste a measured fraction of the water so pumped, to the end that reaction products shall not accumulate, as they would do were there no loss of water except the evaporative loss.

A practical embodiment of the invention will now be described by reference to the accompanying drawing, in which:

Fig. 2 is a view chiefly in elevation, but with parts in section illustrating on a larger scale the proportioning means and dosing means of Fig. 1.

Fig. 3 is a view part in elevation and part in section showing the flow proportioning chamber proper.

Fig. 4 is a fragmentary detail illustrating the construction of the fractional discharge orifice leading from the proportioning chamber.

Figures 1, 5:
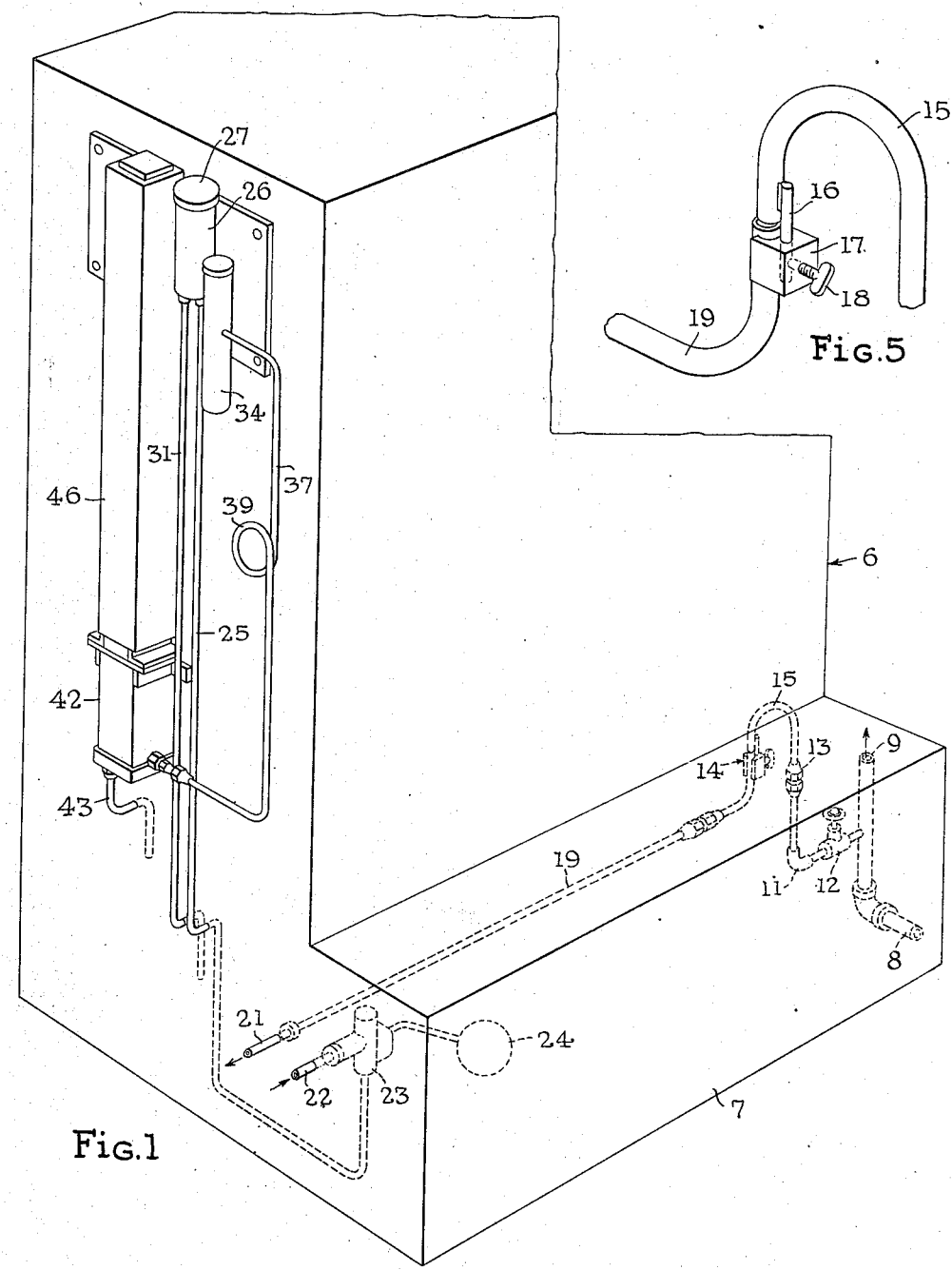
Fig. 1 is a perspective view showing the invention applied to a refrigerative condenser, the details of condenser construction being not fully illustrated.
Fig. 5 is a perspective view of the adjustable bleeder which discharges to waste a part of the circulated water.

Refer first to Fig. 1. The housing of the condenser is indicated generally by the numeral 6. The construction of the condenser may follow past practice, and various types of condensers are known. So far as is here important, there is in the bottom of the housing 6 a water sump 7 which serves as a reservoir for the water used to cool the condenser. Whenever the condenser is operating a pump, not shown in the drawings, draws water from the sump 7 and delivers it to the pipe connection whose entrance is indicated at 8. From the discharge 9 of this connection the water passes to the heat transfer surface of the condenser, whatever form that may take, and after exchanging heat is returned to the sump 7. Thus, water is flowing under pressure from 8 to 9 whenever the condenser is in operation.

A branch connection 11 controlled by a normally-open stop-valve 12 leads from the connection 8, 9 through union 13 to a swivel connection generally indicated by the numeral 14 in Fig. 1 and shown in greater detail in Fig. 5. As there shown a piece of copper pipe 15 bent into an inverted U leads from the union 13 and is connected near its discharge end to an offset swivel pin 16 which may be clamped in a block 17 by a set screw 18. The block 17 is connected to the upwardly presented open end to a drain pipe 19. The pipe 19 extends out of the housing 6 as indicated at 21 and leads to waste, for example, to a city sewer. By swinging the pipes 15 and 19 relatively one to the other, the pipe 15 can be caused to deliver any desired fraction of its flow into the open end of the drain pipe 19. The water which is not delivered to the pipe 19 merely returns to the sump.

The effect of this arrangement is to purge from the system a roughly proportioned small part of the water circulated to cool the condenser. This prevents accumulation in the sump of excessive solids or reaction products.

Evaporation of part of the water by the heat of the condenser, and the discharge of water through the waste connection 19 have the cumulative effect of depleting the water in the sump 7. The rate of depletion varies, the variation being attributable chiefly to variations in the rate at which heat is rejected through the condenser.

From the above it follows that there must be a continuous but varying supply of water to the sump 7. This make-up water is supplied through a connection 22 which ordinarily leads from a city water supply. The rate of supply is controlled by a float valve 23 which is adjusted by a float 24 in response to changes in the liquid level in the sump 7. The water admitted at a variable rate by the valve 23 flows through a pipe 25 to a proportioning device housed in a receptacle 26, and shown in greater detail in Figs. 2–4 inclusive.

Receptacle 26 has a loosely fitting cover or cap 27 so that it is open to the atmosphere at its top. Mounted within the receptacle 26 is a vertical stand pipe 28 (see particularly Fig. 3) which is open at its top and sealed at its bottom to the bottom 29 of the receptacle 26. The pipe 25 delivers water from valve 23 through the connection 30 into the lower end of stand pipe 28.

The stand pipe 28 is open at its upper end to the interior of the receptacle 26. In the normal operation of the device the liquid level never reaches the top of the stand pipe. If some malfunction should cause overflow, the water would simply drain to sump 7 through the drain connection 31, which leads from the bottom of receptacle 26 at a point outside the stand pipe 28 to the sump 7. The normal function of drain 31 is to deliver the by-passed fraction of make-up water to the sump 7.

A short tube 32 leads from the interior of stand pipe 28 at a point far enough above connection 30 to avoid eddies created by entering water. The tube 32 discharges against atmospheric pressure through an interchangeable orifice fitting 33 into the siphon chamber 34. In the side of stand pipe 28 at a level at least as high as and preferably higher than that of the orifice in fitting 33 is a relatively large orifice 35 through which make-up water by-passing the chemical feeder may escape from the interior of the stand pipe 28 to the receptacle 26 and flow thence through the pipe 31 to the sump 7.

At a still higher level a second opening 36 larger than the orifice in fitting 33 is formed through the wall of tube 28. When the level of water is sufficiently high, as a result of rapid make-up feed, flow through opening 36 supplements that through opening 35. The approximate proportions of the small metering orifice in fitting 33 and the openings 35 and 36 are indicated in Fig. 3 and will be discussed hereinafter. Two openings ordinarily suffice but more can be used, it being characteristic that the openings decrease in size as their elevation increases.

A siphon connection 37 has its short leg 38 within the chamber 34 and near the bottom thereof. The long leg of the siphon includes a loop trap 39 and leads to a spray nozzle 41 located in a housing 42 and so positioned that it delivers its spray in an upward direction. A drain 43 leads from the bottom of the housing 41 to the sump 7. A rack, a part of which appears at 44, projects through the open top of the housing 42 and carries a series of chemical cartridges which take the form of balls 45. These balls are stacked in a magazine 46 which is detachably supported at 47 and overlies the rack 44. The arrangement is such that water delivered through the siphon 37 is sprayed on the lowermost one of the balls 45 and gradually dissolves the ball. The resulting chemical solution flows through the drain 43 to the sump 7. When the lowermost ball is nearly completely dissolved, the stack of balls feeds downward by gravity, the effect being to deliver a fresh ball to replace the dissolved one.

The principle on which the device operates will now be explained. The valve 23 passes water at a varying rate to the pipe 25 and this water is delivered to the interior of stand pipe 28 and establishes therein a head which causes the delivery of water through the metering orifice in 33 and through at least the lower orifice 35 of the two larger orifices. If the flow through orifice 33 be plotted as ordinates and the liquid height in the tube 28 be plotted as abscissae, the flow curve for the orifice 33 is not a straight line but has a drooping characteristic. The purpose of the device is to make the flow through the pipe 31 a multiple of the flow through the orifice 33 at all rates of water supply within the range of operation of the valve 23. Thus, the ordinates of the desired curve for the by-pass flow through the pipe 31 are multiples of the ordinates of the curve just described.

The large orifice 35 can be chosen according to known hydraulic principles to have a flow curve which approximates the desired curve in the lower range of heads (i. e., water levels in stand pipe 28), but in the higher range of heads its curve starts to droop too rapidly. At the level in pipe 28 at which said droop becomes significant a second orifice 36, smaller than 35, is located. By adding its flow to that of orifice 35 it lifts the drooping flow characteristics so that again, and for considerably higher heads, the total by-pass flow approximates the desired quantities. The drawing shows only two orifices but a third could be used according to the invention, and so on.

The invention contemplates the use of a series of orifices diminishing in size and each located at a higher level than the next larger; and resides in the concept that the discharge of such a series can be made to approximate closely a multiple of the flow through a small orifice subject to the same changes of head. The flow characteristics of individual orifices under changing heads have long been known, but the possibility of using a series such as described, to become effective at different heads for the purpose of proportioning flow is believed to be new.

It is not practicable to state an inclusive mathematical relationship between the sizes of the apertures and their elevations. Consider for example the fact that the coefficient of flow through 35 will depend on whether the orifice is completely or only partially submerged. Obviously the result secured is only an over-all approximation but it is a good, commercial approximation attained by simple and inexpensive means.

As an example, one commercial embodiment delivers to chamber 34 approximately $1/33$ (say 3%) of the total flow delivered by valve 23. The stand pipe is 9″ high and 2″ in diameter. The inlet connection 30 is $1/2$″. Orifice 33 is $\frac{3}{32}$″ and located $2\frac{3}{8}$″ above the bottom. Orifice 35 is $\frac{9}{16}$″ and located $3\frac{1}{8}$″ above the bottom. Orifice 36 is $\frac{3}{32}$″ and located $6\frac{1}{8}$″ above the bottom. Within a reasonable range the percentage flow delivered by orifice 33 can be changed by changing the size of this orifice.

Various dosing devices could be operated by the discharge from the siphon chamber 34, and that fact is fully recognized. However, the soluble cartridge scheme using a spray nozzle is the simplest arrangement known and is illustrated as a typical feeder. If the chemicals to be fed be necessarily in a liquid form, any of the conventional tilting-cup dosing devices used in water purification plants might be arranged in such a way that its cycles would be controlled by water fed from the siphon chamber 34.

The novelty in the present invention resides in the proportioning means for controlling any dosing device, and not in the dosing device itself.

I claim:

1. In a proportional flow divider the combination of means for supplying water at a varying rate; and a stand pipe open to atmosphere at its upper end and connected to receive the water supplied by said means, said stand pipe having near its lower end a proportioning orifice for discharging an approximately uniform fraction of the quantity supplied, and having a plurality of larger by-pass orifices arranged in vertical sequence in which the orifices diminish in size as their elevation increases and at such rate that they increase the by-pass flow in corrective relation to its lag behind proportionality to head pressure.

2. In a proportional flow divider the combination of means for supplying water at a varying rate; a stand pipe open to atmosphere at its upper end and connected to receive the water supplied by said means, said stand pipe having near its lower end a proportioning orifice for discharging an approximately uniform fraction of the quantity supplied, and having a plurality of larger by-pass orifices arranged in vertical sequence in which the orifices diminish in size as their elevation increases and at such rate that they increase the by-pass flow in corrective relation to its lag behind proportionality to head pressure; a receptacle for accumulating water discharged by said proportioning orifice; and a self-starting siphon for periodically emptying said receptacle, and at flow rates independent of said varying supply rate.

3. The combination of a water-consuming device having a sump from which water is drawn and to which at least a part of said water is returned; a water make-up connection; valve means responsive to water level in said sump and controlling flow from said connection; a stand pipe to which said make-up connection delivers, said stand pipe being open to atmosphere at its upper end and having near its lower end a proportioning orifice and having a plurality of larger by-pass discharge orifices arranged in vertical sequence in which the orifices diminish in size as their elevations increase and at such rate that they increase the flow through said by-pass discharge orifices in corrective relation to the effective head in the stand pipe; means for delivering to the sump the discharge from said by-pass orifices; a chemical feeder arranged to deliver to the sump; and means for delivering the discharge from the proportioning orifice to the chemical feeder.

4. The combination defined in claim 3 in which the means for delivering the discharge from the proportioning orifice comprise a receptacle fed by said orifice and a siphon device serving to discharge said receptacle periodically.

5. The combination defined in claim 3 in which the means for delivering the discharge from the proportioning orifice comprise a receptacle fed by said orifice and a siphon device serving to discharge said receptacle periodically, and the chemical feeder comprises a spray nozzle fed by the siphon device, with related means for sustaining a soluble chemical cartridge in the path of spray from said nozzle.

6. The combination defined in claim 3 in which the water drawn from and returned to the sump flows under at least a moderate pressure head, and adjustable means are provided to bleed a small fraction therefrom and discharge it in adjustable proportions, part to the sump and part to waste.

HARRY W. SHOAF.

REFERENCES CITED

The following references are of record in the file of this patent:

UNITED STATES PATENTS

| Number | Name | Date |
|---|---|---|
| 1,262,730 | Yoder | Apr. 16, 1918 |
| 1,749,130 | Craig | Mar. 4, 1930 |
| 1,943,362 | Bailey | Jan. 16, 1934 |
| 2,162,809 | Groak et al. | June 20, 1939 |
| 2,277,320 | Gygax | Mar. 24, 1942 |
| 2,438,327 | Smalley | Mar. 23, 1948 |
| 2,461,334 | Major | Feb. 8, 1949 |

FOREIGN PATENTS

| Number | Country | Date |
|---|---|---|
| 21,022 | Great Britain | of 1907 |